(12) United States Patent
Cui et al.

(10) Patent No.: US 10,476,114 B2
(45) Date of Patent: Nov. 12, 2019

(54) RECHARGEABLE BATTERY SAFETY BY MULTIFUNCTIONAL SEPARATORS AND ELECTRODES

(71) Applicant: The Board of Trustees of the Leland Stanford Junior University, Stanford, CA (US)

(72) Inventors: Yi Cui, Stanford, CA (US); Hui Wu, Mountain View, CA (US); Denys Zhuo, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 365 days.

(21) Appl. No.: 14/268,988

(22) Filed: May 2, 2014

(65) Prior Publication Data
US 2014/0329120 A1 Nov. 6, 2014

Related U.S. Application Data

(60) Provisional application No. 61/819,333, filed on May 3, 2013.

(51) Int. Cl.
*H01M 10/48* (2006.01)
*H01M 2/14* (2006.01)
*H01M 2/16* (2006.01)
*H01M 10/052* (2010.01)

(52) U.S. Cl.
CPC ............. *H01M 10/48* (2013.01); *H01M 2/14* (2013.01); *H01M 2/1686* (2013.01); *H01M 10/486* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 3,617,376 A | * | 11/1971 | Miller | H01L 35/32 136/206 |
| 3,984,749 A | * | 10/1976 | Muller | H01M 10/44 320/127 |
| 4,139,833 A | * | 2/1979 | Kirsch | H01C 7/006 29/612 |
| 4,812,375 A | | 3/1989 | Foster | |

(Continued)

FOREIGN PATENT DOCUMENTS

| | | |
|---|---|---|
| JP | H10-92476 A | 4/1998 |
| JP | 2010-073558 A | 4/2010 |

(Continued)

OTHER PUBLICATIONS

Control Engineering Staff, Temperature tutorial: Thermocouple vs. RTD vs. thermistor, Apr. 19, 2007; 3 pages total.*

(Continued)

*Primary Examiner* — Ula C Ruddock
*Assistant Examiner* — Anna Korovina
(74) *Attorney, Agent, or Firm* — Foley & Lardner LLP; Cliff Z. Liu

(57) ABSTRACT

A battery includes: 1) an anode; 2) a cathode; 3) a separator disposed between the anode and the cathode, wherein the separator includes at least one functional layer; and 4) a sensor connected to the at least one functional layer to monitor an internal state of the battery.

5 Claims, 12 Drawing Sheets

(56) References Cited

U.S. PATENT DOCUMENTS

| | | | |
|---|---|---|---|
| 5,006,428 A | 4/1991 | Goebel et al. | |
| 6,550,963 B2 * | 4/2003 | Daily | G01K 1/026 136/201 |
| 2006/0093871 A1 * | 5/2006 | Howard | H01M 4/131 429/9 |
| 2006/0186859 A1 * | 8/2006 | Fujikawa | G01R 31/025 320/134 |
| 2009/0104510 A1 * | 4/2009 | Fulop | H01M 2/30 429/50 |
| 2009/0311584 A1 * | 12/2009 | Yamazaki | H01G 9/016 429/93 |
| 2011/0250478 A1 * | 10/2011 | Timmons | H01M 4/485 429/91 |
| 2011/0262786 A1 | 10/2011 | Fuse | |
| 2013/0004811 A1 * | 1/2013 | Banerjee | G01K 7/16 429/62 |

FOREIGN PATENT DOCUMENTS

| | | | | |
|---|---|---|---|---|
| JP | 2010073558 A | * | 4/2010 | |
| JP | 2011-034952 A | | 2/2011 | |
| JP | 2011-124104 A | | 6/2011 | |
| JP | 2012-252876 A | | 12/2012 | |
| WO | WO 2011063132 A1 | * | 5/2011 | H01M 2/166 |
| WO | WO 2014026093 A1 | * | 2/2014 | H01M 2/14 |

OTHER PUBLICATIONS

Noguchi JP 2011 124104 machine translation; 40 pages total.*
Microstar 2009 NPL, http://www.mstarlabs.com/sensors/thermocouple-cold-junctions.html.*
Seebeck 2009 NPL, http://www.explainthatstuff.com/howthermocoupleswork.html.*
Zhang, Journal of Power Sources 196 (2011) 13-24, doi:10.1016/j.jpowsour.2010.07.020 (Year: 2011).*
Chen, G. et al. (2004) "Overcharge Protection for Rechargeable Lithium Batteries Using Electroactive Polymers," Electrochemical and Solid-State Letters 7(2):A23-A26.
Li, S.L. et al. (2011) "A poly(3-decyl thiophene)-modified separator with self-actuating overcharge protection mechanism for LiFePO4-based lithium ion battery," Journal of Power Sources 196(16):7021-7024.
Wu, H. et al. (2014) "Improving battery safety by early detection of internal shorting with a bifunctional separator," Nature Communications 5(5193):1-17.
International Search Report and Written Opinion (ISA/KR) for International Application No. PCT/US2014/036631, dated Sep. 2, 2014.

* cited by examiner

RECHARGEABLE BATTERY SAFETY BY MULTIFUNCTIONAL SEPARATORS AND ELECTRODES

CROSS REFERENCE TO RELATED APPLICATION

This application claims the benefit of U.S. Provisional Application Ser. No. 61/819,333, filed on May 3, 2013, the disclosure of which is incorporated herein by reference in its entirety.

FIELD OF THE INVENTION

The invention generally relates to batteries and, more particularly, separators and electrodes for rechargeable batteries.

BACKGROUND

The energy and power density of electrochemical rechargeable batteries have increased significantly in recent years. Meanwhile, safe operation of these high energy devices has become a stringent requirement especially for applications in large scale renewable energy storage, electric drive vehicles, and next generation portable electronics. For the widely used lithium-ion rechargeable batteries in particular, safety issues are often associated with the formation of dendritic lithium on the negative electrode. In the lithium metal rechargeable battery, lithium dendrites gradually grow on the surface of the lithium metal electrode during discharge-recharge cycles. These dendrites can penetrate through the polymer separator to form a short circuit between the positive and negative electrodes, which can initiate exothermic reactions between the electrodes and the flammable organic electrolyte. The excessive heat released in these reactions often induces fire and even explosions. Due to the inherent instability of lithium metal deposition, research shifted to lithium-ion based batteries during the 1980s. Current commercial lithium-ion batteries utilizing graphite as a negative electrode exhibit an approximately ten-fold lower specific charge capacity but safer operation compared to lithium metal electrodes; however, despite this development, lithium dendrite formation has not been entirely inhibited in graphite anodes either, especially when cycled at high current densities, under overcharge conditions, or at low temperatures.

In the past few decades, multiple approaches have been employed to address this safety problem, with suppression of lithium dendrites as a common strategy. Typical examples are the modification of the electrolyte solvent and solute, re-engineering of the surface morphologies and coating processes of the electrodes, and theoretical models of the mechanisms leading to dendrite formation. Unfortunately, despite intense efforts for several decades, it seems difficult to completely eliminate dendrite formation by current approaches since the lithium re-deposition process is non-uniform and predisposed to formation of dangerous lithium dendrites.

It is against this background that a need arose to develop the separators and electrodes described herein.

SUMMARY

Safe operation is an important prerequisite for use of rechargeable batteries; however, for emerging large-scale applications in electric drive vehicles and wind/solar energy storage, safety of lithium batteries remains a practical challenge. In traditional rechargeable lithium batteries, failures in the form of fire or explosion can be initiated by internal short circuits associated with lithium dendrite formation during electrochemical cycling. To address this problem, embodiments of this disclosure are directed to the implementation of internal protection mechanisms to prevent these accidents. Some embodiments are directed to an innovative strategy for improving safety by designing a smart battery that allows internal battery state to be monitored in-situ. Specifically, some embodiments successfully demonstrate the capability for early detection of lithium dendrite growth inside batteries through a bifunctional separator, which offers a third sensing terminal in addition to the cathode and anode terminals of conventional batteries. The sensing terminal provides a distinctive signal in the form of a pronounced voltage change indicating imminent penetration of dendrites through the separator. This detection mechanism is highly sensitive, accurate, and activated well in advance of shorting, which significantly improves battery safety without sacrificing its energy capacity. This detection mechanism can also be applied to other potential shorting risks, such as manufacturing defects in batteries.

Some aspects of this disclosure are directed to a battery. In some embodiments, the battery includes: 1) an anode; 2) a cathode; 3) a separator disposed between the anode and the cathode, wherein the separator includes at least one functional layer; and 4) a sensor connected to the at least one functional layer to monitor an internal state of the battery.

In some embodiments, the battery includes: 1) a first electrode; 2) a second electrode; 3) a separator disposed between the first electrode and the second electrode; and 4) a sensor to monitor an internal state of the battery, wherein the first electrode includes i) a base electrode layer; ii) a functional layer connected to the sensor; and iii) an electronically insulating, porous layer disposed between the base electrode layer and the functional layer.

Additional aspects of this disclosure are directed to separators incorporating functional layers, electrodes incorporating functional layers, methods of operating batteries incorporating functional layers, and manufacturing methods of separators, electrodes, and batteries.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Embodiments of this disclosure are directed to an innovative strategy to solve a safety problem of rechargeable batteries by sensing impending failure and signaling early warning. Some embodiments implement a smart battery to actively detect dendrites, which upon detection allows the battery to be taken offline before any accidents occur. In some embodiments, early detection of dendrite growth inside lithium batteries is achieved through a multifunctional (e.g., bifunctional) separator design, employing a third sensing terminal to monitor internal battery conditions. Early detection of hazardous conditions allows proactive measures to mitigate against battery failure. Some embodiments of this disclosure can effectively address the safety issues associated with internal shorting without sacrificing energy capacity. Continuous monitoring of internal operation conditions allows batteries to be operated to the full extent of their lifetime rather than prematurely replacing them in anticipation of possible failure by dendrite overgrowth. This battery design concept is generally applicable to other battery types for avoiding internal shorting, paving the path for the next generation of high energy density batteries with enhanced safety features.

Figure 1:
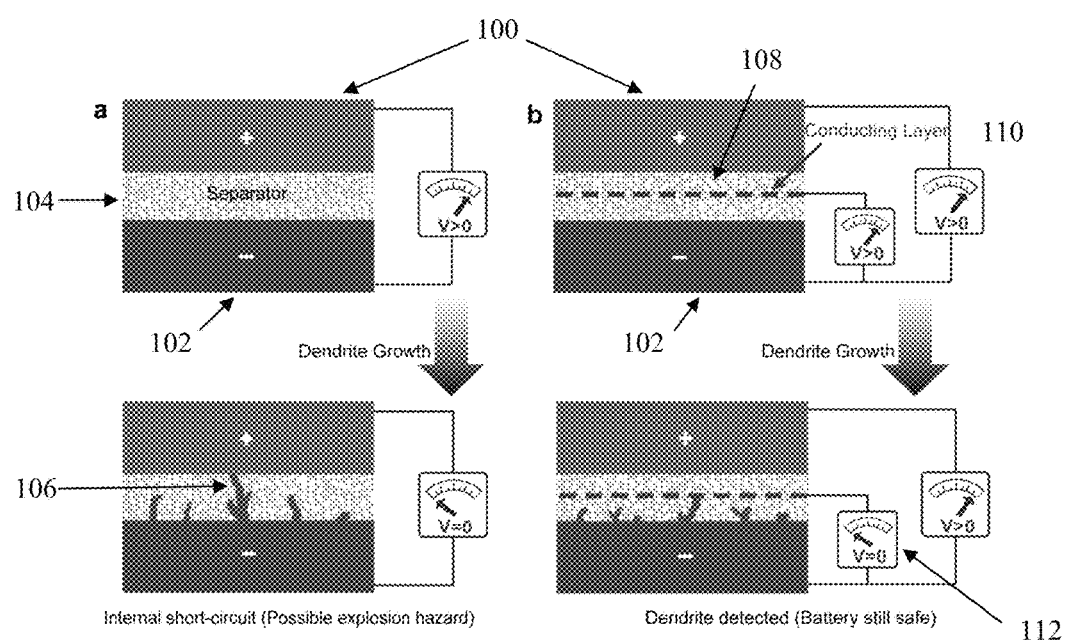
FIG. 1: Schematic of the smart battery design. a, Dendrite formation in a traditional lithium battery where complete penetration of the separator by a lithium dendrite is detected when the battery fails due to internal short circuit and $V_+$-$V_-$ drops to zero. b, In comparison, a lithium battery with bifunctional separator (including a conducting copper layer sandwiched between two polymer separators) where the overgrown lithium dendrite penetrates into the separator and makes contact with the conducting copper layer, giving rise to a drop in $V_{Cu}$-$V_-$ as warning of impending failure due to internal short circuit. However, the full battery remains safely operational with non-zero potential.

A schematic representation of a battery configuration is shown in FIG. 1, according to an embodiment of this disclosure. Traditional batteries include a positive electrode 100 (or cathode) and a negative electrode 102 (or anode) (both sources of chemical reactions) separated by an electrolyte solution containing dissociated salts to allow ion transfer between the two electrodes 100 and 102. During repeated charging of lithium metal batteries, lithium is unevenly electroplated on the anode surface, forming dendrites 106 which eventually penetrate a separator 104 and make electrical contact with the cathode 100, leading to internal short circuits (FIG. 1a). Traditional battery separators act as an electronically insulating layer with a porous structure made of inert polymers; these separators generally are not effective in blocking overgrowth of dendrites. In the improved design, the separator 108 is changed to a polymer-metal-polymer triple layer configuration (FIG. 1b). Note that although a thin and porous conducting metal has been introduced as an intermediate conductive layer 110, the sandwiched membrane maintains electronic insulation between the two electrodes 100 and 102 and still functions effectively as the separator 108. Due to the electrochemical potential difference between two metals, the voltage between the intermediate metal layer 110 and the anode 102 can be monitored. During battery cycling the dendrite 106 will form on the anode 102 and grow until it inevitably reaches the intermediate metal layer 110 before puncturing through the whole separator 108. When the dendrite 106 connects the metal layer 110 and the anode 102, a voltage drop between them can be detected rapidly by a voltage sensor 112 that is connected to a sensing terminal of the separator 108 and an anode terminal. Upon detection of this distinctive signal of abnormal function or state, the battery can be taken offline, effectively preventing fire and explosion that can result if the short circuit reaction is allowed to proceed uncontrollably. In such manner, the intermediate metal layer 110 is included as a functional layer to detect dendrite penetration in the multi-layered separator 108, while maintaining separator functions of electronic insulation between the two electrodes 100 and 102 and ionic conductivity to allow passage of lithium ions or other applicable ions in the electrolyte solution. Alternatively, or in combination, the voltage between the intermediate metal layer 110 and the cathode 100 can be monitored in a similar manner as discussed for the anode 102.

In the embodiment of FIG. 1b, the intermediate metal layer 110 is formed by magnetosputtering with little or no additional heating, since the separator layers are sensitive to temperature. Other deposition techniques that can be carried out at or about room temperature or with reduced heating are contemplated, such as vacuum deposition and solution phase deposition.

More generally, anodes can include, for example, carbon, lithium metal, silicon, tin, and mixtures of two or more of these materials. Other examples of anodes include those formed of aluminum, sodium, magnesium, lead, metal hydride, and zinc. Anodes can be battery electrodes where dendrite or filament can form, causing a potential shorting of batteries. A multifunctional separator of some embodiments also can detect battery manufacturing defects, where a potential short might exist during battery manufacturing. Embodiments of this disclosure is broadly applicable to all types of batteries for detecting shorts, such as lithium-ion batteries, lithium-sulfur batteries, lithium-air batteries, lithium polysulfide flow batteries, sodium-based batteries, magnesium-based batteries, aluminum-based batteries, zinc-based batteries, lead acid batteries, nickel metal hydride batteries, and nickel-cadmium batteries.

A conducting layer included in a multifunctional separator can be formed of any of a variety of electronically conducting materials, such as metals (e.g., copper, nickel, titanium, aluminum, gold, palladium, platinum, silver, zinc, and iron), electronically conducting carbon, metal alloys, electronically conducting polymers, electronically conducting metal oxides and chalcogenides, metal nitrides, metal carbides, metal silicides, metal halides, and semiconductor materials. A conducting layer can be formed as a coating or film of a single type of electronically conducting material, or can be formed as a coating or film of multiple types of electronically conducting materials. In some embodiments, a conducting layer can be formed as a coating or film of nanostructures, which can have any of a variety of shapes, such as spheroidal, tetrahedral, tripodal, plate-shaped, disk-shaped, pyramid-shaped, box-shaped, cube-shaped, cylindrical, tubular, wire-shaped, branch-shaped, and a number of other geometric and non-geometric shapes. Examples of nanostructures include fullerenes, graphene, carbon nanotubes (e.g., single-walled carbon nanotubes and multi-walled carbon nanotubes), metal nanowires (e.g., copper nanowires, nickel nanowires, and silver nanowires), metal oxide nanowires (e.g., zinc oxide nanowires, copper oxide nanowires, tin oxide nanowires, indium tin oxide nanowires, and iron oxide nanowires), metal carbide nanowires, germanium nanowires, silicon nanowires, silicide nanowires, carbide nanowires, nitride nanowires, and core-shell nanowires (e.g., a shell formed of copper, nickel, or silver surrounding a core formed of another material). In the case of a multifunctional separator includes multiple conducting layers, the conducting layers can be formed of the same material or different materials as set forth above.

In some embodiments, a thickness of a conducting layer (or another functional layer) included in a multifunctional separator can be in the range of less than about (or about) 1 nm to about 200 nm, such as from less than about (or about) 1 nm to about 150 nm, from about 1 nm to about 100 nm, from about 5 nm to about 80 nm, from about 5 nm to about 60 nm, from about 5 nm to about 50 nm, from about 5 nm to about 40 nm, from about 5 nm to about 30 nm, or from about 5 nm to about 20 nm. A sheet resistance of a conducting layer included in a multifunctional separator can be in the range of about 0.1 $\Omega$/sq to about 1,000,000 $\Omega$/sq, such as from about 0.1 $\Omega$/sq to about 100,000 $\Omega$/sq, from about 1 $\Omega$/sq to about 10,000 $\Omega$/sq, from about 1 $\Omega$/sq to about 1,000 $\Omega$/sq, from about 1 $\Omega$/sq to about 500 $\Omega$/sq, from about 1 $\Omega$/sq to about 200 $\Omega$/sq, from about 1 $\Omega$/sq to about 100 $\Omega$/sq, from about 1 $\Omega$/sq to about 60 $\Omega$/sq, from about 1 $\Omega$/sq to about 40 $\Omega$/sq, from about 1 $\Omega$/sq to about 20 $\Omega$/sq, from about 1 $\Omega$/sq to about 10 $\Omega$/sq, or from about 1 $\Omega$/sq to about 5 $\Omega$/sq. The sheet resistance also can be below about 1 $\Omega$/sq or below about 0.1 $\Omega$/sq. In the case of a multifunctional separator including multiple conducting layers, the conducting layers can have the same thickness or different thicknesses as set forth above, and can have the same sheet resistance or different sheet resistances as set forth above.

In other embodiments, a thickness of a conducting layer (or another functional layer) included in a multifunctional separator can be in the range of about 200 nm to about 1,000 nm, such as from about 200 nm to about 400 nm, from about 400 nm to about 600 nm, from about 600 nm to about 800 nm, or from about 800 nm to about 1,000 nm. A sheet resistance of a conducting layer included in a multifunctional separator can be up to or below about 1,000 $\Omega$/sq, such as up to or below about 500 $\Omega$/sq, up to or below about 200 $\Omega$/sq, up to or below about 100 $\Omega$/sq, up to or below about 50 $\Omega$/sq, up to or below about 10 n/sq, up to or below about 1 $\Omega$/sq, or up to or below about 0.1 $\Omega$/sq. In the case of a multifunctional separator including multiple conducting layers, the conducting layers can have the same thickness or different thicknesses as set forth above, and can have the same sheet resistance or different sheet resistances as set forth above.

In other embodiments, a thickness of a conducting layer (or another functional layer) included in a multifunctional separator can be in the range of about 200 nm to about 2,000 nm, such as from about 200 nm to about 400 nm, from about 400 nm to about 600 nm, from about 600 nm to about 800 nm, from about 800 nm to about 1,000 nm, from about 1,000 nm to about 1,200 nm, from about 1,200 nm to about 1,400 nm, from about 1,400 nm to about 1,600 nm, from about 1,600 nm to about 1,800 nm, or from about 1,800 nm to about 2,000 nm. A sheet resistance of a conducting layer included in a multifunctional separator can be up to or below about 1,000 $\Omega$/sq, such as up to or below about 500 $\Omega$/sq, up to or below about 200 $\Omega$/sq, up to or below about 100 $\Omega$/sq, up to or below about 50 $\Omega$/sq, up to or below about 10 $\Omega$/sq, up to or below about 1 $\Omega$/sq, or up to or below about 0.1 $\Omega$/sq. In the case of a multifunctional separator including multiple conducting layers, the conducting layers can have the same thickness or different thicknesses as set forth above, and can have the same sheet resistance or different sheet resistances as set forth above.

In other embodiments, a thickness of a conducting layer (or another functional layer) included in a multifunctional separator can be in the range of about 2,000 nm to about 10,000 nm, such as from about 2,000 nm to about 4,000 nm, from about 4,000 nm to about 6,000 nm, from about 6,000 nm to about 8,000 nm, or from about 8,000 nm to about 10,000 nm. A sheet resistance of a conducting layer included in a multifunctional separator can be up to or below about 1,000 Ω/sq, such as up to or below about 500 Ω/sq, up to or below about 200 Ω/sq, up to or below about 100 Ω/sq, up to or below about 50 Ω/sq, up to or below about 10 Ω/sq, up to or below about 1 Ω/sq, or up to or below about 0.1 Ω/sq. In the case of a multifunctional separator including multiple conducting layers, the conducting layers can have the same thickness or different thicknesses as set forth above, and can have the same sheet resistance or different sheet resistances as set forth above.

FIG. 2 are schematic representations of various examples of multifunctional separators, according to embodiments of this disclosure.

Figure 2A:
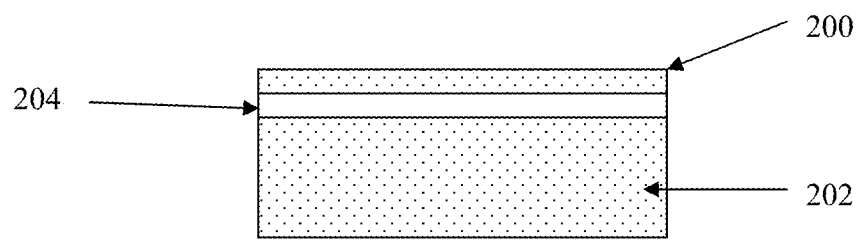
FIGS. 2a, 2b, 2c, 2d, 2e, 2f, and 2g: Schematic representations of various examples of multifunctional separators.

FIG. 2a shows a multi-layered separator including a relatively thick, porous, electronically insulating separator layer 202 and a relatively thin, porous, electronically insulating separator layer 200, between which is disposed a functional layer 204, such as a conducting layer for dentrite detection or another functional layer as further described below. The thick porous separator layer 202 can be implemented using, for example, a traditional battery separator formed of a polymer with a thickness in the range of about 1 μm to about 25 μm, such as from about 1 μm to about 20 μm or from about 5 μm to about 20 μm, and the functional layer 204 can be deposited on the thick porous separator layer 202, followed by deposition of the thin porous separator layer 200 on the functional layer 204 using sputtering or another suitable deposition technique. In some embodiments, a thickness of the thin porous separator layer 200 can be in the range of about 1 nm to about 200 nm, such as from about 1 nm to about 150 nm, from about 1 nm to about 100 nm, from about 5 nm to about 80 nm, from about 5 nm to about 60 nm, from about 5 nm to about 50 nm, from about 5 nm to about 40 nm, from about 5 nm to about 30 nm, or from about 5 nm to about 20 nm. In other embodiments, a thickness of the thin porous separator layer 200 can be in the range of about 200 nm to about 1,000 nm, such as from about 200 nm to about 400 nm, from about 400 nm to about 600 nm, from about 600 nm to about 800 nm, or from about 800 nm to about 1,000 nm. In other embodiments, a thickness of the thin porous separator layer 200 can be in the range of about 200 nm to about 2,000 nm, such as from about 200 nm to about 400 nm, from about 400 nm to about 600 nm, from about 600 nm to about 800 nm, from about 800 nm to about 1,000 nm, from about 1,000 nm to about 1,200 nm, from about 1,200 nm to about 1,400 nm, from about 1,400 nm to about 1,600 nm, from about 1,600 nm to about 1,800 nm, or from about 1,800 nm to about 2,000 nm. In other embodiments, a thickness of the thin porous separator layer 200 can be in the range of about 2,000 nm to about 10,000 nm, such as from about 2,000 nm to about 4,000 nm, from about 4,000 nm to about 6,000 nm, from about 6,000 nm to about 8,000 nm, or from about 8,000 nm to about 10,000 nm. The thin porous separator layer 200 can be formed as a coating or film of an electronically insulating material, such as a ceramic or a polymer, or can be formed as a coating or film of nanostructures of such an electronically insulating material.

Figure 2B:
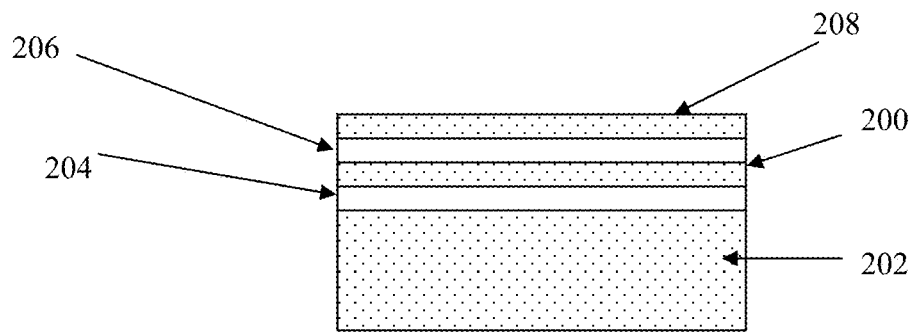

FIG. 2b shows another multi-layered separator. Like the multi-layered separator of FIG. 2a, the multi-layered separator of FIG. 2b includes the thick porous separator layer 202 and the thin porous separator layer 200, between which is disposed the functional layer 204. In addition, the multi-layered separator of FIG. 2b includes another functional layer 206, which is deposited on the thin porous separator layer 200 using sputtering or another suitable deposition technique, followed by deposition of another thin porous separator layer 208 on the functional layer 206 using sputtering or another suitable deposition technique. The functional layers 204 and 206 can be the same or different (e.g., can perform the same or different functions), and the thin porous separator layers 200 and 208 can be the same or different. Certain aspects of the multi-layered separator of FIG. 2b can be implemented in a similar manner as discussed above for FIG. 2a, and those aspects are not repeated.

Figure 2C:
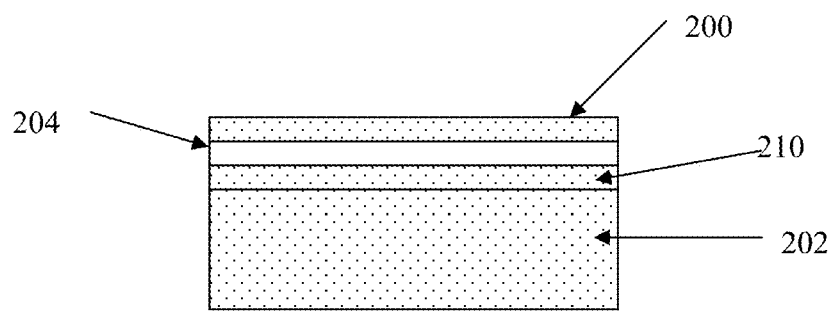

FIG. 2c shows another multi-layered separator. Like the multi-layered separator of FIG. 2a, the multi-layered separator of FIG. 2c includes the thick porous separator layer 202 and the thin porous separator layer 200, between which is disposed the functional layer 204. In addition, the multi-layered separator of FIG. 2c includes another thin porous separator layer 210, which is deposited on the thick porous separator layer 202 using sputtering or another suitable deposition technique, followed by deposition of the functional layer 204 on the thin porous separator layer 210. The thin porous separator layer 210 can serve a material compatibility function between the functional layer 204 and the thick porous separator layer 202, and can aid in adhering or binding the functional layer 204 to the thick porous separator layer 202. Certain aspects of the multi-layered separator of FIG. 2c can be implemented in a similar manner as discussed above for FIGS. 2a and 2b, and those aspects are not repeated.

Figure 2D:
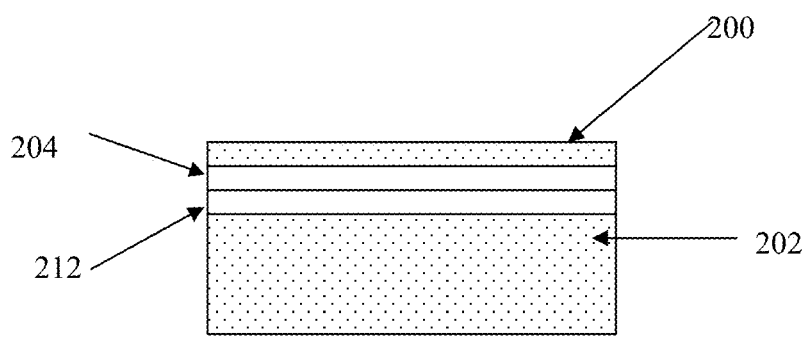

FIG. 2d shows another multi-layered separator. Like the multi-layered separator of FIG. 2a, the multi-layered separator of FIG. 2d includes the thick porous separator layer 202 and the thin porous separator layer 200, between which is disposed the functional layer 204. In addition, the multi-layered separator of FIG. 2d includes another functional layer 212, which is deposited on the thick porous separator layer 202 using sputtering or another suitable deposition technique. The functional layers 204 and 212 can be the same or different (e.g., can perform the same or different functions). For example, the functional layer 212 can be formed of a different electronically conductive material (e.g., a different metal) from that of the functional layer 204, and can serve a material compatibility function and aid in adhering or binding the functional layer 204 to the thick porous separator layer 202. Certain aspects of the multi-layered separator of FIG. 2d can be implemented in a similar manner as discussed above for FIGS. 2a, 2b, and 2c, and those aspects are not repeated.

Figure 2E:
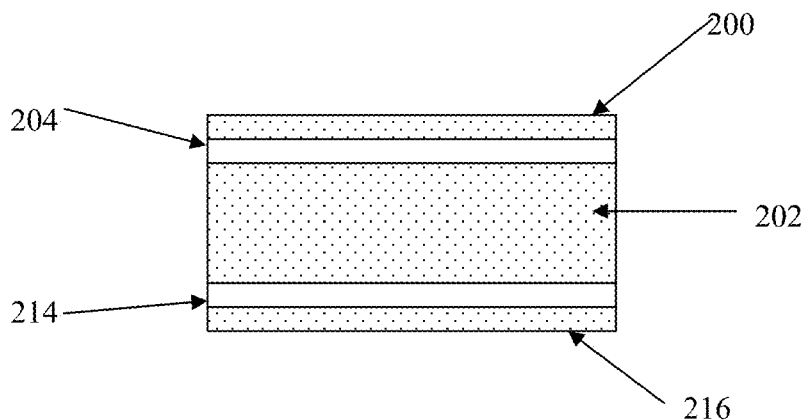

FIG. 2e shows another multi-layered separator. Like the multi-layered separator of FIG. 2a, the multi-layered separator of FIG. 2e includes the thick porous separator layer 202 and the thin porous separator layer 200 over a top side of the thick porous separator layer 202, between which is disposed the functional layer 204 on the top side of the thick porous separator layer 202. In addition, the multi-layered separator of FIG. 2e include additional layers on a bottom side of the thick porous separator layer 202, namely another functional layer 214, which is deposited on the bottom side of the thick porous separator layer 202 using sputtering or another suitable deposition technique, followed by deposition of another thin porous separator layer 216 on the functional layer 214 using sputtering or another suitable deposition technique. The functional layers 204 and 214 can be the same or different (e.g., can perform the same or different functions), and the thin porous separator layers 200 and 216 can be the same or different. Certain aspects of the multi-layered separator of FIG. 2e can be implemented in a similar manner as discussed above for FIGS. 2a, 2b, 2c, and 2d, and those aspects are not repeated. The two-sided design shown for the multi-layered separator of FIG. 2e also can be adapted for the multi-layered separators of FIGS. 2a, 2b, 2c, and 2d.

Figure 2F:
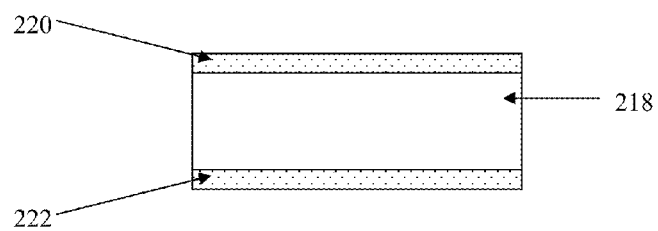

FIG. 2f shows another multi-layered separator. The multi-layered separator includes a relatively thick, porous, electronically conducting layer 218, and a pair of relatively thin, porous, electronically insulating separator layers 220 and 220, which are deposited on opposite sides of the thick porous conducting layer 218 using sputtering or another suitable deposition technique. The thick porous conducting layer 218 serves as a functional layer 204, such as for dentrite detection, and can be implemented using, for example, a porous foil, a mesh, or other porous structure of an electronically conducting material with a thickness in the range of about 1 μm to about 25 μm, such as from about 1 μm to about 20 μm or from about 5 μm to about 20 μm. The thin porous separator layers 220 and 222 can be the same or different. Certain aspects of the multi-layered separator of FIG. 2f can be implemented in a similar manner as discussed above for FIGS. 2a, 2b, 2c, 2d, and 2e, and those aspects are not repeated.

Figure 2G:
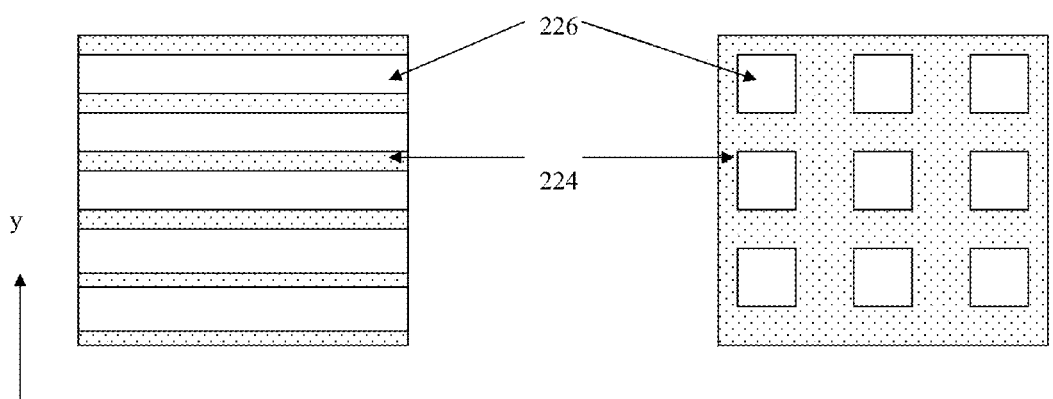

FIG. 2g shows top views of additional multi-layered separators. The multi-layered separators each include a porous, electronically insulating separator layer 224, on which is deposited a functional layer 226, such as a conducting layer for dentrite detection or another functional layer as further described below. In the case of FIG. 2g, the functional layer 226 is deposited on the porous separator layer 224 so as to provide a coverage of less than 100% of a surface of the porous separator layer 224, such as up to about 99%, up to about 98%, up to about 95%, up to about 90%, up to about 85%, up to about 80%, up to about 75%, up to about 70%, up to about 60%, or up to about 50%, and down to about 20%, down to about 15%, down to about 10%, down to about 5%, down to about 2%, or down to about 1%.

As shown in FIG. 2g, the functional layer 226 is patterned as an array of elongated, substantially parallel strips on the left side of FIG. 2g, and as an array of substantially polygonal (e.g., substantially square-shaped) pads on the right side of FIG. 2g. Patterning of the functional layer 226 allows an internal battery state to be monitored as a function of position along one or more directions along the multi-layered separators. For example, each of the strips on the left side of FIG. 2g can be connected to a respective voltage sensor to detect dendrite penetration as well as a position of a resulting pinhole along the y-direction. As another example, each of the pads on the right side of FIG. 2g can be connected to a respective voltage sensor to detect dendrite penetration as well as a position of a resulting pinhole along both the x-direction and the y-direction. Patterning of the functional layer 226 and the shapes of the strips and pads can be varied from that shown in FIG. 2g. Also, although not shown in FIG. 2g, one or more additional layers can be included above or below the functional layer 226. Certain aspects of the multi-layered separators of FIG. 2g can be implemented in a similar manner as discussed above for FIGS. 2a, 2b, 2c, 2d, 2e, and 2f, and those aspects are not repeated.

Referring to FIGS. 1b, 2a, 2b, 2c, 2d, 2e, 2f, and 2g, one or more functional layers are included in the multi-layered separators, while maintaining separator functions of electronic insulation between two electrodes and ionic conductivity to allow passage of lithium ions or other applicable ions in an electrolyte solution. In some embodiments, a resistance across a thickness of the multi-layered separators is at least about $1\times10^5\Omega$, such as at least about $1\times10^6\Omega$, at least about $1\times10^7\Omega$, at least about $1\times10^8\Omega$, at least about $1\times10^9\Omega$, at least about $1\times10^{10}\Omega$, or at least about $1\times10^{11}\Omega$, and up to about $1\times10^{13}\Omega$, up to about $1\times10^{14}\Omega$, or more. In some embodiments, an ionic conductivity of lithium ions or other applicable ions across a thickness of the multi-layered separators is at least about 0.05 mS/cm, such as at least about 0.1 mS/cm, at least about 0.15 mS/cm, at least about 0.20 mS/cm, at least about 0.25 mS/cm, or at least about 0.30 mS/cm, and up to about 0.35 mS/cm, up to about 0.40 mS/cm, up to about 0.45 mS/cm, or more.

Other functional layers can be included in multifunctional separators in place of, or in combination with, electronically conducting layers to monitor an internal battery state. Examples of other functional layers include temperature responsive layers, optical layers, magnetic layers, chemically responsive layers, and combinations thereof.

Figure 3:
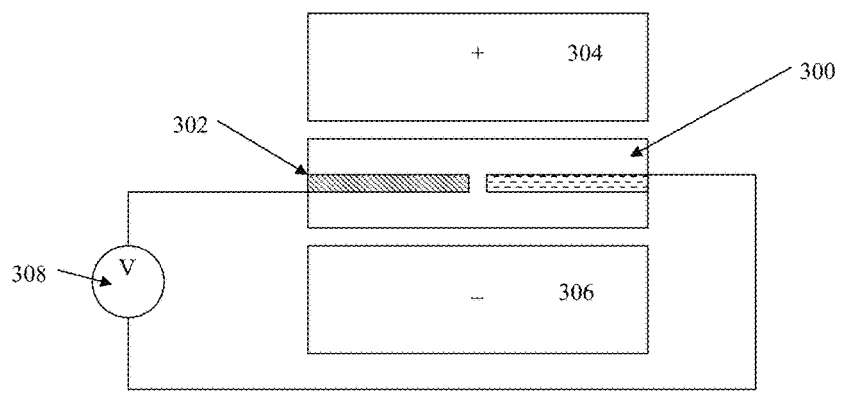
FIG. 3: Schematic representation of a battery configuration with a multifunctional separator including a temperature responsive layer.

FIG. 3 is a schematic representation of a battery configuration, according to an embodiment of this disclosure. Like the battery configuration of FIG. 1b, the battery configuration of FIG. 3 includes a positive electrode 304, a negative electrode 306, and a multifunctional separator 300 disposed between the positive electrode 304 and the negative electrode 306. Referring to FIG. 3, the multifunctional separator 300 includes a temperature responsive layer 302 as a functional layer. In the illustrated embodiment, the temperature responsive layer 302 includes at least two different materials that are electronically isolated from one another, and at least one of these materials exhibits a thermoelectric effect. For example, the temperature responsive layer 302 can include two different thermoelectric materials (e.g., one with a "positive" thermoelectric coefficient, and one with a "negative" thermoelectric coefficient), or one thermoelectric material and another material that exhibits little or no thermoelectric effect, such as an electronically conducting material listed above. The inclusion of these two different materials produces a voltage change in response to a temperature difference or variation across the two materials, which voltage change can be detected by a voltage sensor 308 that is connected to a sensing terminal of one of the two materials and a sensing terminal of another one of the two materials. Suitable calibration can be used to convert voltage changes to absolute or relative temperatures. Upon detection of abnormal heating, the battery can be taken offline, effectively preventing fire and explosion that can result if an undesired exothermic reaction is allowed to proceed uncontrollably.

Examples of thermoelectric materials include electroactive materials, such as lithium transition metal oxides (e.g., lithium manganese oxide ($LiMn_2O_4$), lithium cobalt oxide ($LiCoO_2$), lithium nickel oxide ($LiNiO_2$), lithium titanium oxide ($Li_4Ti_5O_{12}$), $LiCo_{1/3}Ni_{1/3}Mn_{1/3}O_2$, and Li($Li_aNi_xMn_yCo_z$)$O_2$), lithium transition metal phosphates (e.g., lithium titanium phosphate ($LiTi_2(PO_4)_3$)) and lithium iron phosphate ($LiFePO_4$)), and lithium transition metal fluorophosphates (e.g., lithium iron fluorophosphate ($Li_2FePO_4F$)). Additional examples of thermoelectric materials include electronically conductive polymers that can undergo doping/de-doping reactions, such as nitrogen-containing aromatic polymers (e.g., polypyrroles, polycarbazoles, polyindoles, polyanilines, and polyazepines), sulfur-containing aromatic polymers (e.g., poly(3,4-ethylenedioxythiophene)), polythiophenes, polyfluorenes, polyphenylenes, polypyrenes, polyazulenes, polynapthalenes, polyacetylenes, and poly(p-phenylene vinylene).

Multifunctional separators including a temperature responsive layer can be implemented in a number of other ways, such as according to FIGS. 2a, 2b, 2c, 2d, 2e, 2f, and 2g. For example, a temperature responsive layer can be patterned as shown in FIG. 2g, thereby allowing an internal battery temperature to be monitored as a function of position along one or more directions along a multi-layered separator.

Figure 4:
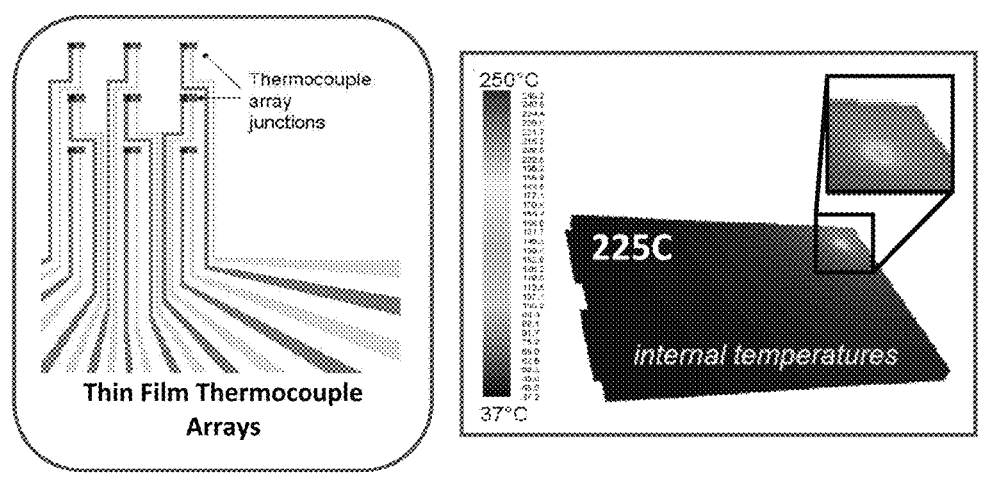
FIG. 4: Schematic representation of a multifunctional separator including an array of thermocouples.

In other embodiments, a temperature responsive layer can be implemented using thermocouples, such as in the form of an array of thermocouples shown on the left side of FIG. 4. In such an array, each thermocouple can include two different materials in contact, which produce a voltage change when heated. This voltage change can be detected by a voltage sensor that is connected to sensing terminals of the array of thermocouples. Suitable calibration can be used to convert voltage changes to absolute or relative temperatures across a multifunctional separator, as shown on the right side of FIG. 4. Upon detection of abnormal heating, the battery can be taken offline, effectively preventing fire and explosion that can result if an undesired exothermic reaction is allowed to proceed uncontrollably.

Figure 5A:
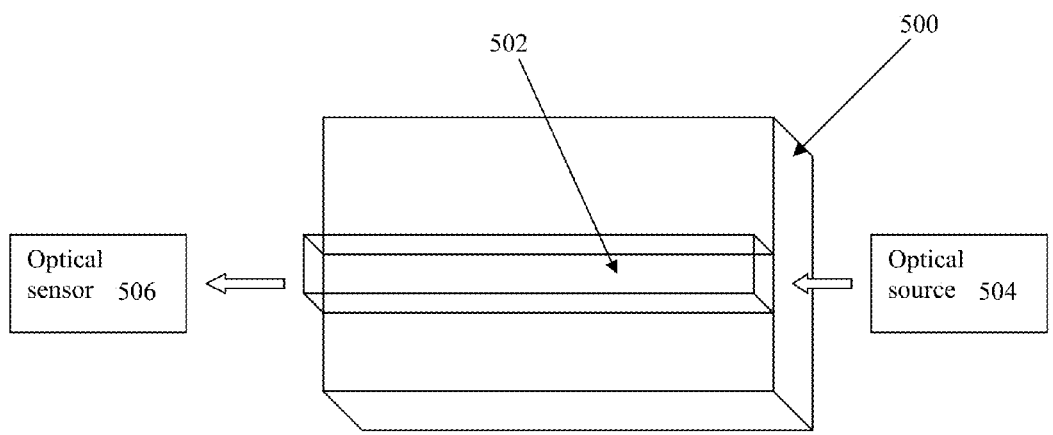
FIG. 5A: Schematic representation of a multifunctional separator including an optical waveguide.

FIG. 5A is a top perspective view of a multifunctional separator, according to an embodiment of this disclosure. The multifunctional separator includes a porous, electronically insulating separator layer 500, on which is formed an optical waveguide 502 as a functional layer. Although the single waveguide 502 is shown in FIG. 5A, it is contemplated that multiple waveguides can be included, such as in the form of an array of waveguides. The waveguide 502 allows an internal battery state to be optically monitored, by supplying an input optical signal using an optical source 504 that is coupled to one end of the waveguide 502, and detecting any changes in an output optical signal, compared to the input optical signal, using an optical sensor 506 that is coupled to another end of the waveguide 502. Changes in the output optical signal, relative to the input optical signal, can correspond to changes in intensity, changes in wavelength (e.g., Raman shifts or shifts in peak wavelength), changes in an optical spectrum (e.g., spectral broadening or narrowing), and any other changes induced by pressure (e.g., resulting from dendrite penetration), chemical changes within a battery, or other changes in internal state of the battery.

A cross-sectional shape of the waveguide 502 can be square-shaped, rectangular, spheroidal, circular, triangular, or other polygonal or non-polygonal shapes, and the waveguide 502 can be formed of glass, tin oxide, zinc oxide, silicon, or other high reflective index materials that can guide an optical signal by total internal reflection.

Various other embodiments are encompassed by this disclosure. For example, in addition to incorporation of one or more functional layers in a porous polymer separator, such functional layers also can be incorporated in other battery components, such as solid polymer electrolytes, gel electrolytes, inorganic solid electrolytes, or any combination thereof. Functional layers for monitoring of an internal battery state also can be incorporated in anodes and cathodes, such as by forming an electronically conducting layer (or other functional layer) as a coating or film on an anode or a cathode with an electronically insulating layer in between.

Figure 5B:
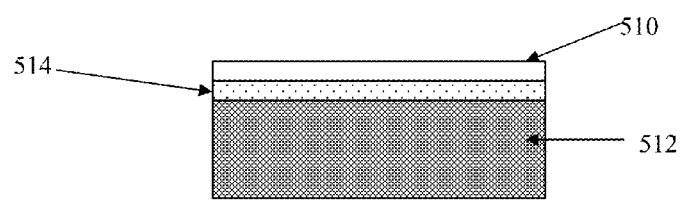
FIG. 5B: Schematic representation of an electrode including a functional layer.

FIG. 5B is a schematic representation of a battery electrode incorporating a functional layer, according to an embodiment of this disclosure. The electrode, which can be either an anode or a cathode, includes a base electrode layer 512 formed of an electro-active material, and also includes a functional layer 510, such as a conducting layer for dendrite detection or another functional layer as described above. Between the base electrode layer 512 and the functional layer 510 is a relatively thin, porous, electronically insulating layer 514. The electrode can be implemented by forming the base electrode layer 512, and the thin porous layer 514 can be deposited on the base electrode layer 512, followed by deposition of the functional layer 510 using sputtering or another suitable deposition technique. Certain aspects of the functional layer 510 and the thin porous layer 514 can be implemented in a similar manner as discussed above for FIGS. 1 and 2, and those aspects are not repeated. Also, one or more additional functional layers and one or more additional electronically insulating layers can be included in the electrode, such as according to the configurations shown in FIG. 2. Also, one or more functional layers included in the electrode can be patterned, as discussed with reference to FIG. 2.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Figure 6:
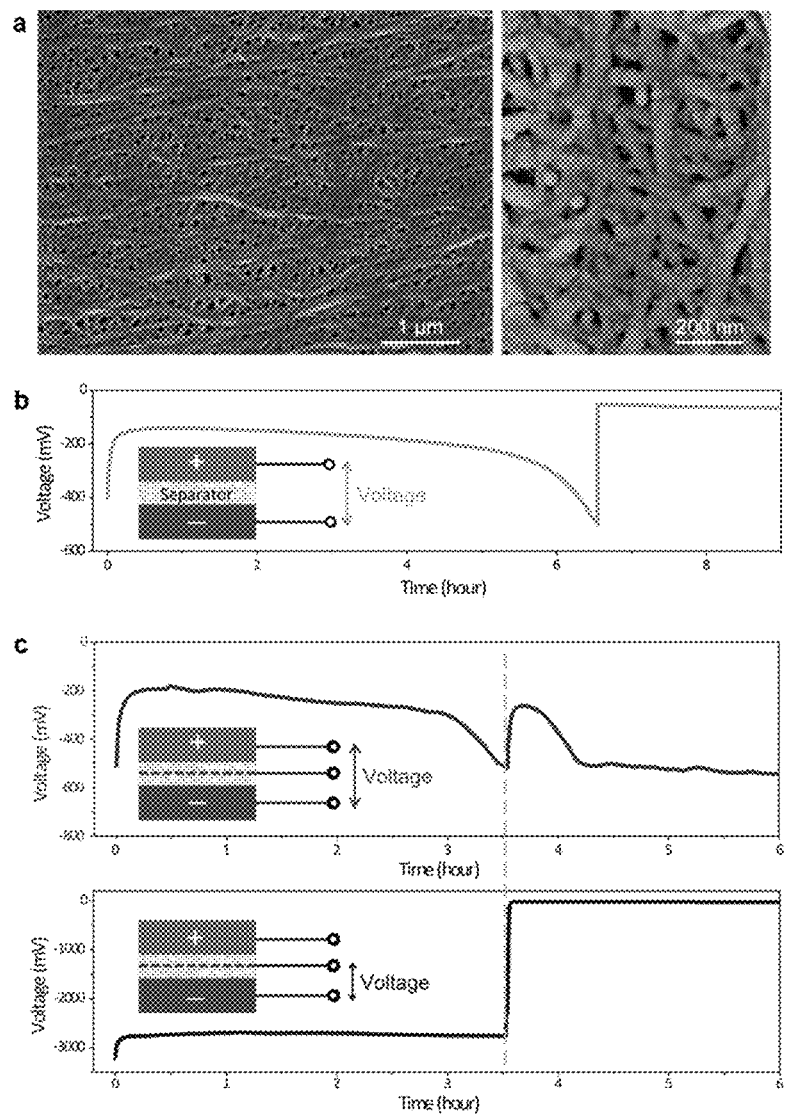
FIG. 6: Demonstration of dendrite detection. a, Scanning electron microscope (SEM) images of commercial polymer separator coated with about 50 nm copper layer, which preserves the separator's porous surface morphology. b, Voltage profiles of a Li/Li battery with a conventional separator under accelerated charging at current density of about 4 mA/cm$^2$. After about 6.5 hours, the battery shorts as a result of dendrite growth, with $V_+$-$V_-$ dropping to zero. c, Voltage profiles of a Li/Li battery with a bifunctional separator under accelerated charging, where $V_+$-$V_-$ (top) and $V_{Cu}$-$V_-$ (bottom) is monitored. After about 3.5 hours, the lithium dendrite makes contact with the copper layer on the separator so $V_{Cu}$-$V_-$ drops to 0 V. Notice that the full cell remains safely operational with non-zero voltage.
Figure 9:
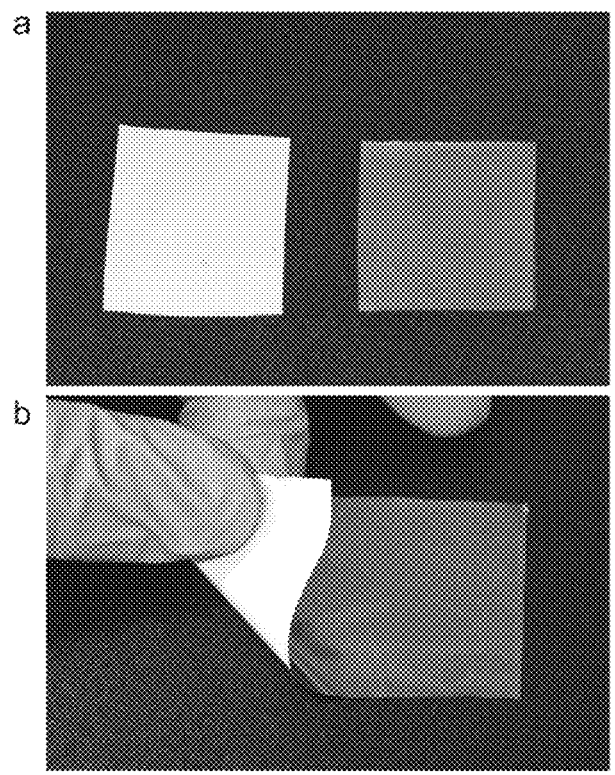
FIG. 9: Image of a separator coated with about 50 nm copper layer. a, commercial battery separator before (left) and after (right) copper coating. b, Separator remained flexible after metal coating.
Figure 10:
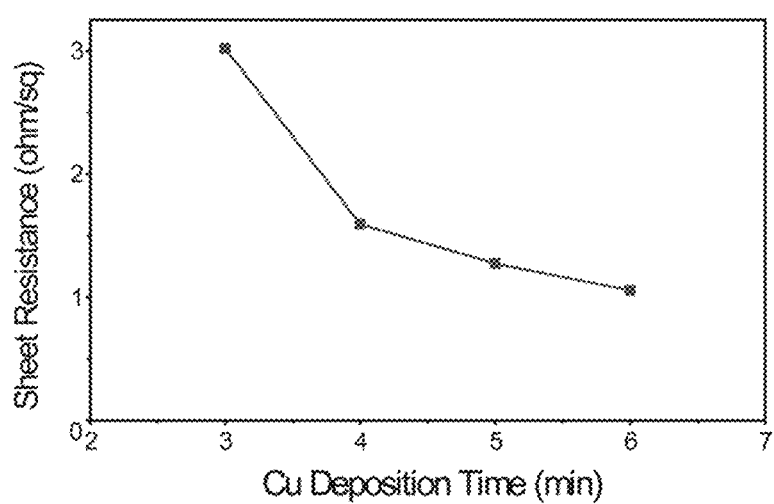
FIG. 10: The sheet resistance of a separator after copper deposition for varying times.
Figure 11:
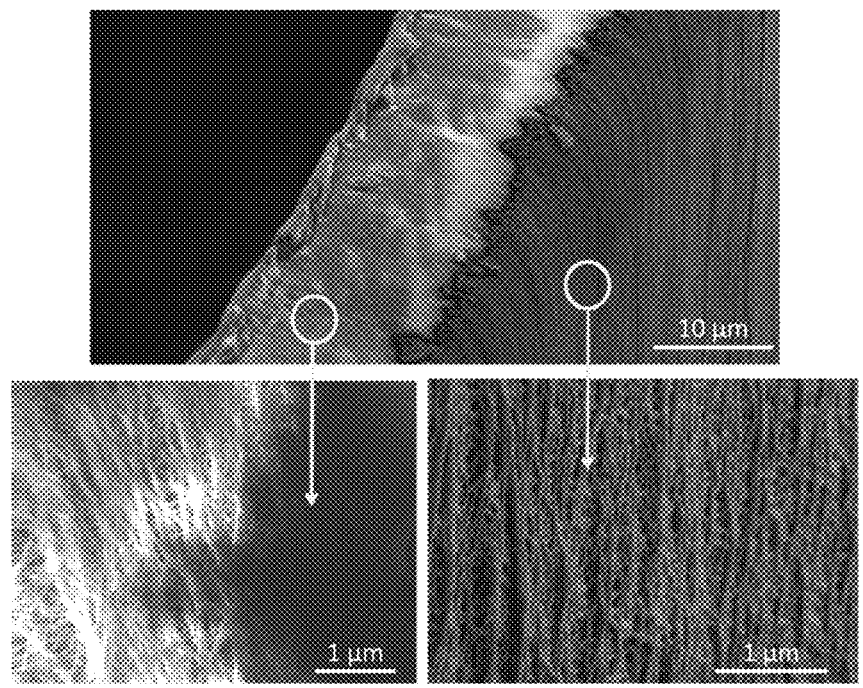
FIG. 11: SEM cross section image of the copper coated separator. SEM image with higher magnification for the cross section (lower left) and copper coated outer surface (lower right) is shown.
Figure 12:
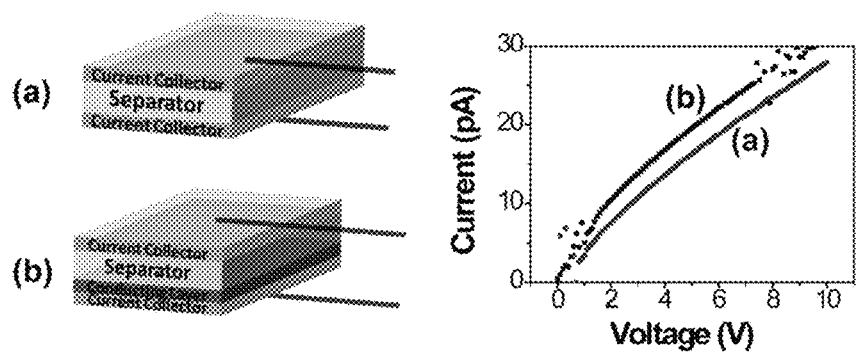
FIG. 12: Current-voltage (I-V) curve for separator before (a) and after (b) coating with copper, indicating that the two sides of separator remained electronically insulated from one another after metal deposition. The test method is illustrated on the left.
Figure 13:
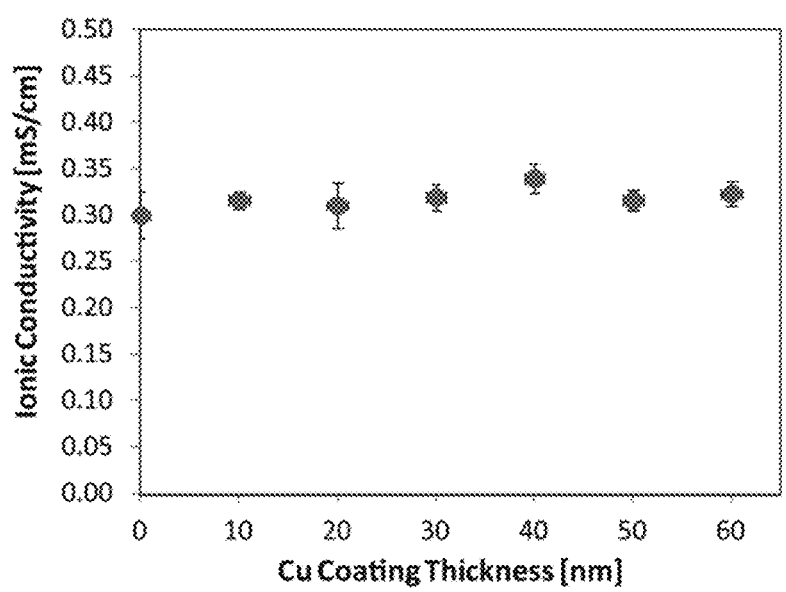
FIG. 13: Ionic conductivity of copper coated separator with error bars showing one standard deviation. The average ionic conductivity of the separator remained unchanged after copper coating up to about 60 nm.

The proposed battery protection mechanism is demonstrated experimentally. A bifunctional separator is fabricated by stacking two conventional separators, one of which was pre-deposited with about 50 nm thick copper layer by magnetosputtering without additional heating, since the separator is sensitive to temperature (see fabrication process in Methods). The separator surface becomes highly conducting due to the metal coating (FIGS. 9 and 10). FIG. 6a presents the surface morphology of the metal coated separator. As can be observed, the highly porous separator surface structure is preserved after metal deposition, indicating that lithium ion transfer across the separator is preserved. Additionally, the three dimensional (3D) porous structure of the polymer separator allows metal to be deposited on the outer surface without permeating inside the membrane (FIG. 11), thus ensuring electrical insulation of the stacked tri-layer separator (FIG. 12). Electrochemical impedance spectroscopy (EIS) further demonstrates that the tri-layer separator is transparent to lithium ions and highly insulating to electrons (FIG. 13).

The tri-layer separator is assembled into lithium batteries with an additional terminal connected to the copper layer. During standard operation of a lithium metal battery, dendrite growth can be slow and can involve long time-scales to completely penetrate the separator. To examine the formation of lithium dendrites within reasonable time frames, two lithium metal electrodes are used with extremely high galvanostatic current densities to accelerate the growth of dendrites. As shown in FIG. 6b, for a battery with a traditional separator, the voltage between the two electrodes ($V_+$-$V_-$) was about −200 mV when charged at a current density of about 4.0 mA/cm$^2$. $V_+$-$V_-$ slowly decreased to about −500 mV due to the formation of an insulating solid-electrolyte-interphase (SEI) layer. Further charging initiated a sudden drop of $V_+$-$V_-$, which correlates to the appearance of short-circuits caused by penetration of the separator. In a battery with the tri-layer separator design, the voltage between the lithium electrode and the intermediate copper layer ($V_{Cu}$-$V_-$) is also monitored while charging the battery at the same current density (about 4.0 mA/cm$^2$). As illustrated in FIG. 6c, a sharp decrease in the $V_{Cu}$-$V_-$ appears after charging for a few hours, indicating that the lithium dendrite has made contact with the copper layer. Substantially simultaneously, a change in $V_+$-$V_-$ from about −500 mV to about −250 mV was detected. The sudden voltage decrease is mainly due to the reduction in total resistance of the cell as the effective distance between the two lithium electrodes is decreased when the dendrite electrically bridges one lithium electrode with the intermediate copper layer. The two lithium electrodes, however, remain electrically isolated from one another, indicating that the battery is still safely operational at this stage. The sudden drop in $V_{Cu}$-$V_-$ can be recognized as a safety alarm indicating lithium dendrite penetration through about half of the separator. By varying the thickness ratio between the two separator layers, the critical point at which an alarm is generated can be tuned to indicate 25%, 50%, 75%, or any degree of separator penetration by a lithium dendrite.

Figure 7:
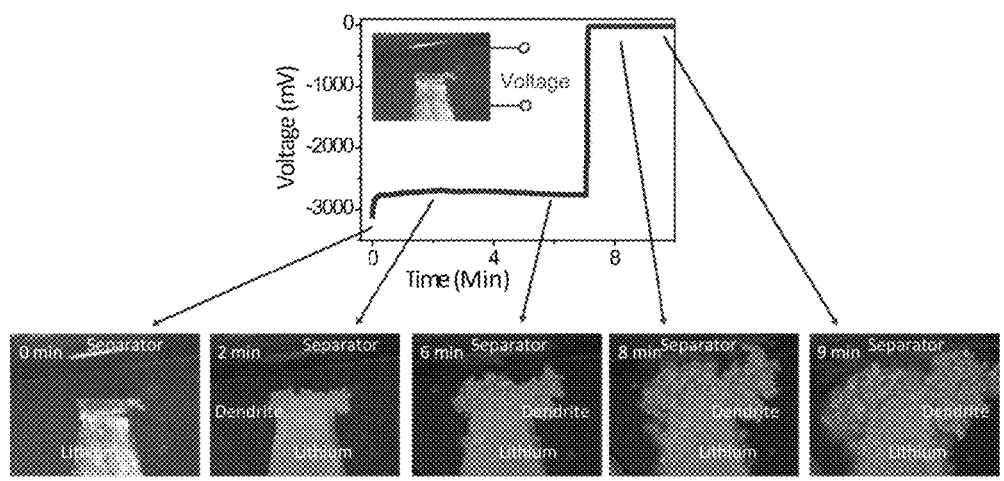
FIG. 7: A lithium anode and separator-wrapped lithium counter electrode with copper conductive layer facing the lithium anode housed in a glass cell for in-situ optical microscopy observation. During charging of the cell, non-uniform lithium electrode deposition leads to mossy dendrite formation and growth on the surface of the lithium electrode. The lithium dendrites make contact with the copper layer on the separator at about 6 to 8 minutes, giving rise to about 3 V drop in $V_{Cu}$-$V_-$, as the potential difference between copper and lithium is dissipated upon contact.
Figure 14A:
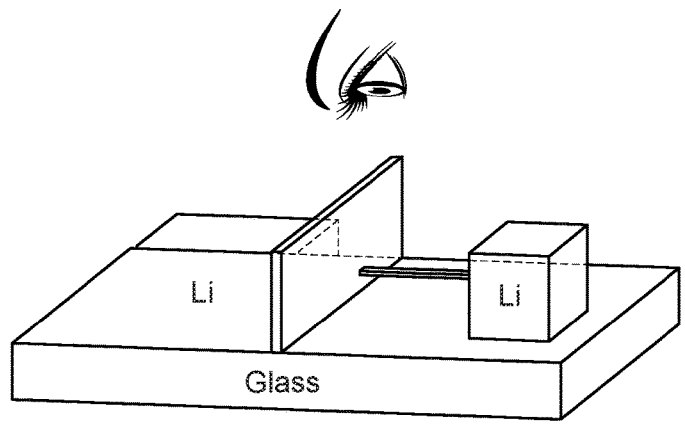
FIG. 14: a, Illustration of a battery device for direct observation of Li dendrite growth and Li—Cu contact during charging. b and c, Images of the fabricated battery device for optical microscopy observation.
Figure 14B:
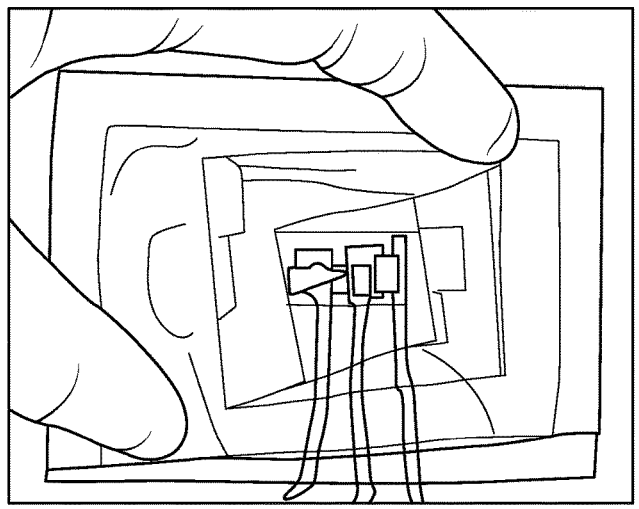
Figure 14C:
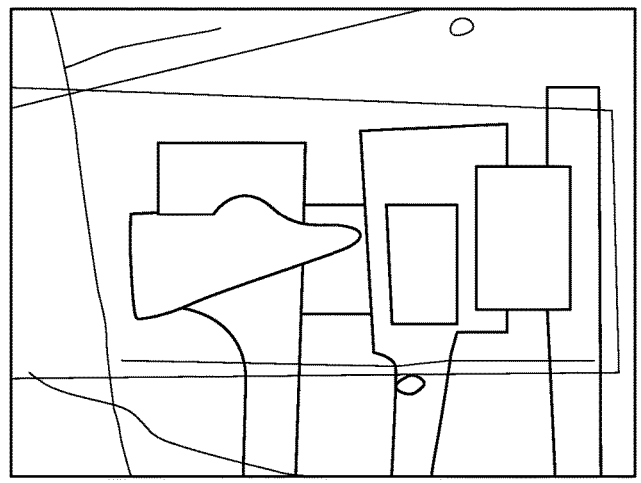

The dendrite alarm mechanism is further confirmed by in-situ observation of dendrite growth inside a battery. To examine the battery operation in an optical microscope, a battery device is fabricated and sealed in a transparent pouch cell with electrolyte, which is constructed by placing two thin lithium tips beside a polymer separator with copper deposited on one side (FIG. 14). FIG. 7 shows lithium being continuously plated onto the lithium electrode surface during accelerated electrochemical charging, consequently inducing dendrite formation and growth. The voltage between the lithium tip and the copper layer on the separator $V_{Cu}$-$V_-$ is monitored during this process. The value is initially measured to be about 3 V, representing the potential difference between lithium and copper. As lithium is continuously electrodeposited, the dendrite grows across the electrode gap until it makes contact with the copper layer on the separator, and the potential between lithium and copper, $V_{Cu}$-$V_-$, drops to about 0 V between about 6 and 8 minutes of charging. This observation demonstrates that dendrite formation inside the battery leads to a drop in $V_{Cu}$-$V_-$, a reliable indicator of overgrown dendrite penetration through the separator.

Figure 8:
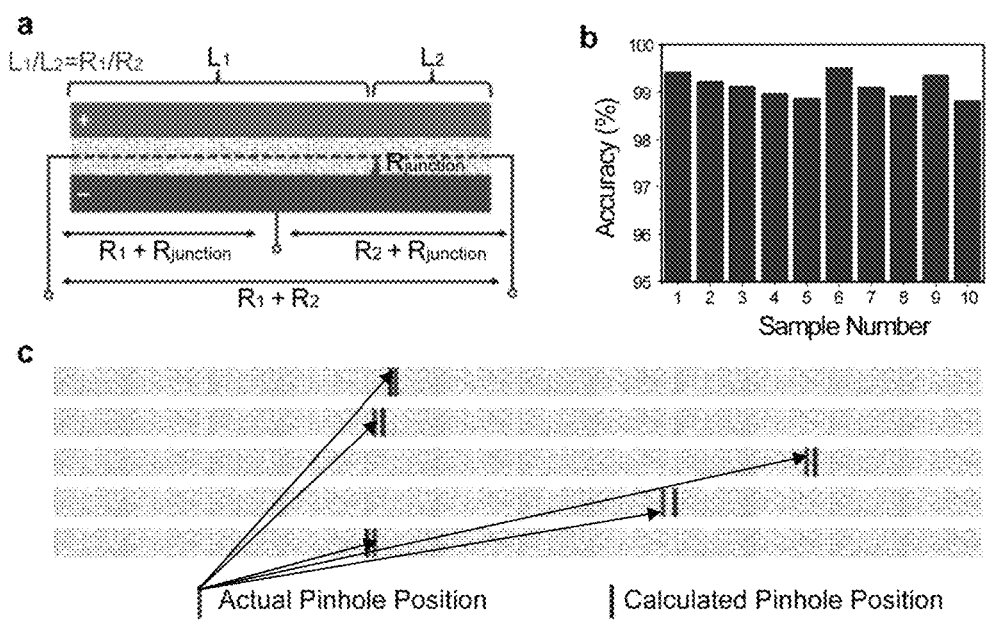
FIG. 8: Dendrite pinhole puncture position determined by resistance measurement. a, The resistance measured from the copper-coated separator leads on either side of the separator to the negative electrode lead includes a fixed junction resistance term, $R_{junc}$, and a sheet resistance term, $R_1$ or $R_2$, which scales with the distance between the pinhole and separator lead. $R_{junc}$ can be determined if the resistance between the two separator leads, $R_1+R_2$, is measured. The ratio in pinhole position from the two edges of the separator corresponds to the ratio between the resistances measured between each separator lead and the negative electrode lead. b, Percentage difference between the actual position and the calculated position of the pinhole from measured resistances. c, Separator schematic indicating relative difference.

The position of the overgrown dendrite can also be determined based on this battery design. Once the dendrite bridges the lithium electrode with the copper layer, the location of the corresponding pinhole in one dimension can be determined by measuring the resistance between the terminals as illustrated in FIG. 8a. The resistance measured from the separator leads on either end of the copper-coated separator to the negative terminal includes a fixed copper-lithium junction resistance term, $R_{junc}$, and a copper sheet resistance term, $R_1$ or $R_2$, which scales with the distance between the pinhole and the two separator leads. $R_{junc}$ can be determined once the resistance between the two separator leads, $R_1+R_2$, is measured. The ratio of the sheet resistances $R_1/R_2$ corresponds to the ratio between the distances from the separator terminals to the pinhole, $L_1/L_2$. The results confirm that this method can accurately detect the dendrite coordinates to within about 2% of the actual dendrite position (FIGS. 8b and c). This battery design, which can report not only potential safety risks due to dendrite formation, but also the position of existing pinholes, can aid further treatment and recycling of the battery.

Methods:

Materials Fabrication and Cell Assembly:

The conducting layer was fabricated by sputtering copper (AJA International ATC Orion, about 5 mTorr pressure, about 150 W power, and about 15 sccm argon flow) for about 5 minutes onto commercially available 12 µm Teklon Gold LP microporous polyethylene separator membrane. The sheet resistance of coated separator was determined by applying silver paste lines forming a square on the separator conducting layer, with electrical measurements made with a multimeter. Pouch cells with lithium foil as both electrodes were assembled and sealed in an argon-filled glove box. Copper foil was used as electrical leads to the anode and counter electrode as well as the conducting layer. The conducting layer sandwiched between two separators was soaked in electrolyte, 1 M $LiPF_6$ in ethylene carbonate/diethyl carbonate (about 1:1; Merck).

Electrochemical Test:

The cells were charged at about 4 mA/cm$^2$ while $V_{Cu-Li}$ was monitored with an MTI 8-channel battery tester. Electrochemical impedance spectroscopy (EIS) measurements were carried out on a Bio Logic VMP3 with AC oscillation amplitude of about 10 mV over the frequency range of about 100 kHz to about 1 Hz. Separators with varying thickness of conductive layers were soaked in electrolyte and sandwiched between stainless steel electrodes then sealed inside a pouch cell.

In-situ Optical Microscopy Observation:

A lithium foil anode and lithium foil counter electrode wrapped in a copper-coated separator were placed facing one another inside a glass observation cell filled with electrolyte. Observation was carried out in an Olympus BX51M microscope under normal white-light illumination at 50× magnification.

Pinhole Position Detection:

Copper leads were affixed to both ends of a copper-coated separator, and a pinhole was made by lightly pricking the separator with the tip of a 22 G syringe needle. Assembly of the pouch cell was as outlined previously. The resistances were measured with a multimeter.

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, relative terms, such as "exterior," "inner," "outer," "top," "upper," "upwardly," "lower," "bottom," "downwardly," "lateral," and "laterally," refer to an orientation of a set of objects with respect to one another, such as in accordance with the drawings, but do not require a particular orientation of those objects during manufacturing or use.

As used herein, the term "nanometer range" or "nm range" refers to a range of dimensions from about 1 nanometer (nm) to about 1 micrometer (µm). The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 µm.

As used herein, the term "micrometer range" or "µm range" refers to a range of dimensions from about 1 µm to about 1 millimeter (mm) The µm range includes the "lower μm range," which refers to a range of dimensions from about 1 μm to about 10 μm, the "middle μm range," which refers to a range of dimensions from about 10 μm to about 100 μm, and the "upper μm range," which refers to a range of dimensions from about 100 μm to about 1 mm.

As used herein, the term "aspect ratio" refers to a ratio of a largest dimension or extent of an object and an average of remaining dimensions or extents of the object, where the remaining dimensions can be substantially orthogonal with respect to one another and with respect to the largest dimension. In some instances, remaining dimensions of an object can be substantially the same, and an average of the remaining dimensions can substantially correspond to either of the remaining dimensions. For example, an aspect ratio of a cylinder refers to a ratio of a length of the cylinder and a cross-sectional diameter of the cylinder. As another example, an aspect ratio of a spheroid refers to a ratio of a dimension along a major axis of the spheroid and a dimension along a minor axis of the spheroid.

As used herein, the term "nanostructure" refers to an object that has at least one dimension in the nm range. A nanostructure can have any of a wide variety of shapes, and can be formed of a wide variety of materials. Examples of nanostructures include nanowires, nanotubes, and nanoparticles.

As used herein, the term "nanowire" refers to an elongated, nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the μm range, and an aspect ratio that is about 3 or greater.

As used herein, the term "nanotube" refers to an elongated, hollow, nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the μm range, and an aspect ratio that is about 3 or greater.

As used herein, the term "nanoparticle" refers to a spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 3, such as about 1.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:

1. A battery comprising:
   an anode;
   a cathode;
   a separator disposed between the anode and the cathode, wherein the separator includes at least one functional layer; and
   a sensor connected to the at least one functional layer to monitor an internal state of the battery, wherein the at least one functional layer includes a temperature responsive layer, the temperature responsive layer includes a) a first, thermoelectric material including a first sensing terminal and b) a second, electronically conducting material including a second sensing terminal, the second, electronically conducting material is electronically isolated from the first, thermoelectric material, the second, electronically conducting material is devoid of lithium, and the sensor is connected to the first sensing terminal of the first, thermoelectric material and the second sensing terminal of the second, electronically conducting material to monitor an internal temperature of the battery.

2. The battery of claim 1, wherein the sensor includes a voltage sensor.

3. The battery of claim 1, wherein the first, thermoelectric material includes at least one of a lithium transition metal oxide, a lithium transition metal phosphate, or a lithium transition metal fluorophosphate.

4. The battery of claim 1, wherein the second, electronically conducting material is selected from the group consisting of copper, nickel, titanium, aluminum, gold, palladium, platinum, silver, zinc, iron, and electronically conducting carbon.

5. The battery of claim 1, wherein the separator includes a porous, electronically insulating separator layer, and the temperature responsive layer is coated on the porous, electronically insulating separator layer.

* * * * *